UNITED STATES PATENT OFFICE.

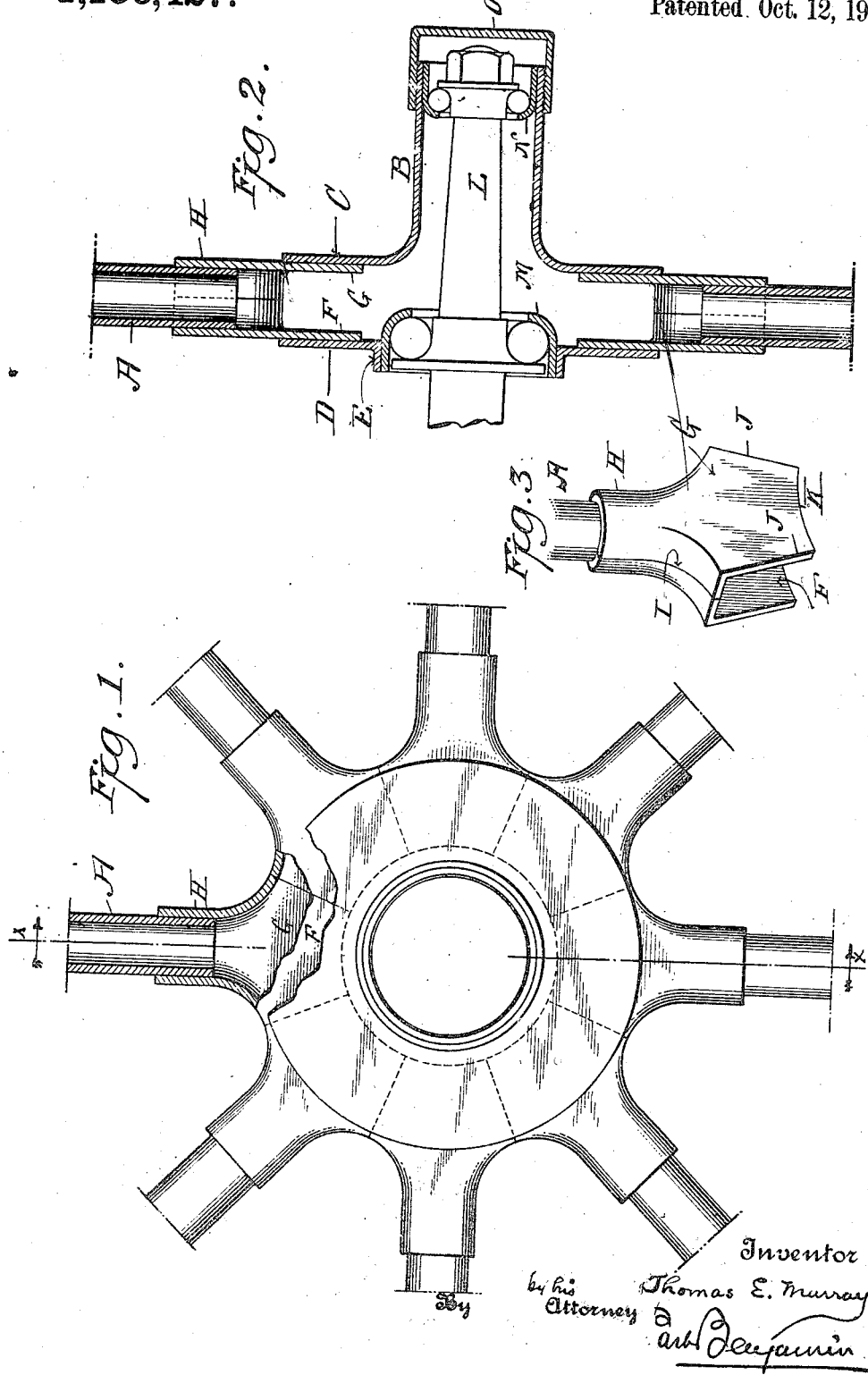

THOMAS E. MURRAY, OF NEW YORK, N. Y.

VEHICLE-WHEEL.

1,156,427.

Specification of Letters Patent.    Patented Oct. 12, 1915.

Application filed May 28, 1915. Serial No. 30,934.

*To all whom it may concern:*

Be it known that I, THOMAS E. MURRAY, a citizen of the United States, residing at New York, in the county of New York and State of New York, have invented a certain new and useful Improvement in Vehicle-Wheels, of which the following is a specification.

The invention relates to vehicle wheels of sheet metal, and consists in the construction hereinafter set forth.

The object is to simplify and cheapen the wheel, while at the same time giving it all necessary strength.

The hub is formed of a flanged tubular portion and an annular disk. The spokes are metal tubes. In order to unite the spokes to the hub, junction pieces are provided having parallel flat plates which enter between the disk and the flange on the tubular portion of the hub and are welded thereto. Each junction piece also has a tubular portion, into which the inner end portion of the spoke enters and is secured by welding.

In the accompanying drawings—Figure 1 is a face view of my wheel, the outer portions of the spokes being broken away and the rim omitted, and the inner portion of one spoke with its junction piece being shown in section. Fig. 2 is a section on the line $x$, $x$ of Fig. 1. Fig. 3 is a perspective view of one of the spoke junction pieces.

Similar letters of reference indicate like parts.

The spokes A are tubular and of metal. The hub comprises a tubular portion B, having a circumferential flange C, and an annular disk D, preferably flanged at E. In order to join the spokes to the hub, I provide junction pieces, one of which is shown in perspective in Fig. 3. Each junction piece comprises two flat parallel plates F, G, and a tubular portion H integral therewith. For convenience, said junction piece may be made in two parts united at the joint I. The side edges J of the plates F, G preferably converge toward the end edges K. The construction is to be such that the plates F, G fit between the flange C and disk D of the hub, to which they may be homogeneously united by electrical welding. The inner ends of the spokes are received in the tubular portions H of said junction pieces and are secured therein in like manner. The axle L is received in ball-bearings, the runways M, N of which are respectively received in the tubular portion B of the hub and the flange E of disk D, and also secured by welding. A cap O may close the outer end of the hub.

I claim:

A vehicle wheel of metal, comprising tubular spokes, a hub comprising a tubular portion having a circumferential flange and an annular disk, and junction pieces, each having a tubular portion to receive a spoke and two parallel flat plates integral with said tubular portion; the said plates fitting between and being homogeneously united to said disk and said flange.

In testimony whereof I have affixed my signature in presence of two witnesses.

THOMAS E. MURRAY.

Witnesses:
  GERTRUDE T. PORTER,
  MAY T. MCGARRY.